(12) United States Patent
Chew

(10) Patent No.: US 7,710,989 B2
(45) Date of Patent: May 4, 2010

(54) SCALABLE AND CONFIGURABLE QUEUE MANAGEMENT FOR NETWORK PACKET TRAFFIC QUALITY OF SERVICE

(75) Inventor: Yen Hsiang Chew, Penang (MY)

(73) Assignee: Intel Corporation, Santa Clara, CA (US)

( * ) Notice: Subject to any disclaimer, the term of this patent is extended or adjusted under 35 U.S.C. 154(b) by 450 days.

(21) Appl. No.: 11/682,742

(22) Filed: Mar. 6, 2007

(65) Prior Publication Data

US 2008/0219279 A1 Sep. 11, 2008

(51) Int. Cl.
*H04L 12/56* (2006.01)
*H04L 1/16* (2006.01)
(52) U.S. Cl. .................. 370/412; 370/252; 370/419
(58) Field of Classification Search ................ 370/412, 370/252, 419
See application file for complete search history.

(56) References Cited

U.S. PATENT DOCUMENTS

| 6,629,179 | B1 * | 9/2003 | Bashford ................... 710/260 |
| 2005/0078694 | A1 * | 4/2005 | Oner ........................ 370/412 |
| 2005/0165995 | A1 * | 7/2005 | Gemelli et al. ............. 710/305 |
| 2006/0277330 | A1 * | 12/2006 | Diepstraten et al. ......... 710/40 |
| 2007/0076605 | A1 * | 4/2007 | Cidon et al. ............... 370/230 |
| 2007/0174529 | A1 * | 7/2007 | Rodriguez et al. .......... 710/240 |

* cited by examiner

*Primary Examiner*—John Pezzlo
(74) *Attorney, Agent, or Firm*—Kacvinsky LLC

(57) ABSTRACT

Various embodiments are directed to scalable and configurable queue management for network packet traffic Quality of Service (QoS). In one or more embodiments, the queue management may be implemented by a network processor comprising a queue manager to assert interrupts indicating that one or more queues require service, and a core processor to apply an interrupt mask to a status register value identifying the one or more queues that require service and to provide service during a particular service cycle to only those queues that are not masked out. Other embodiments are described and claimed.

14 Claims, 4 Drawing Sheets

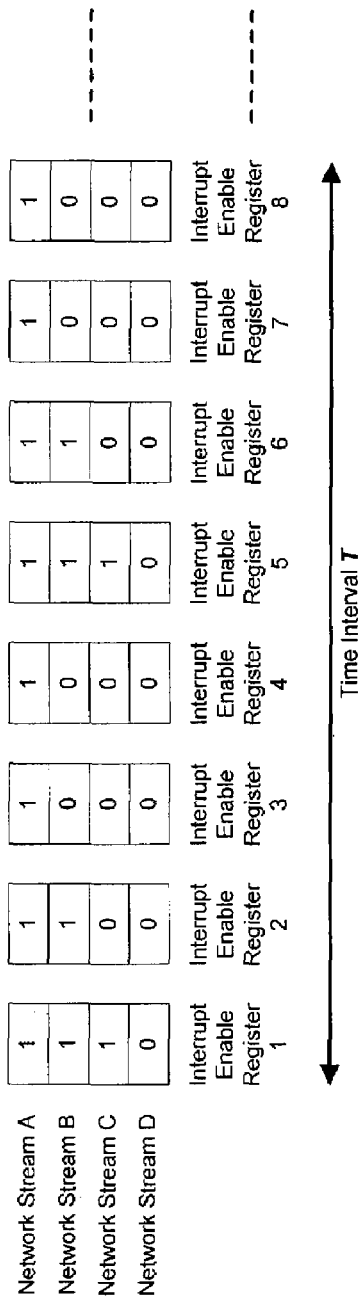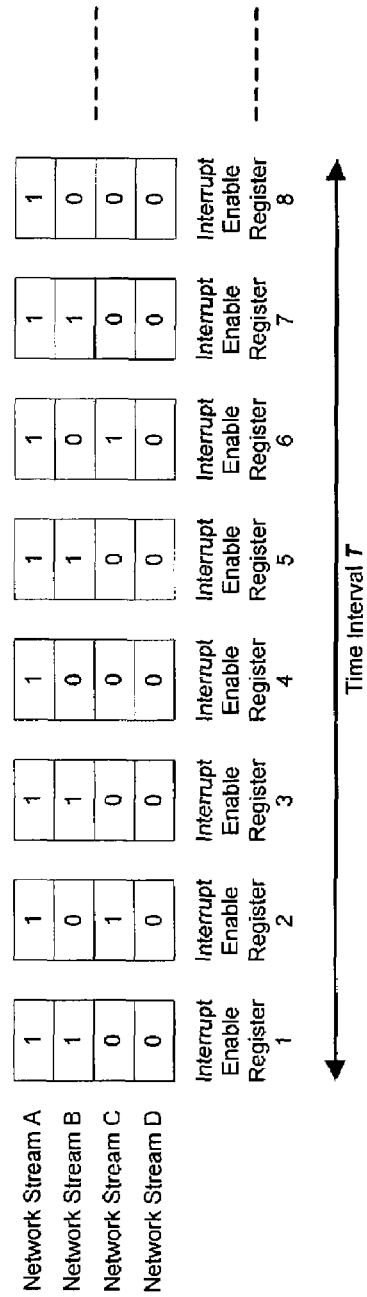

SCALABLE AND CONFIGURABLE QUEUE MANAGEMENT FOR NETWORK PACKET TRAFFIC QUALITY OF SERVICE

CROSS-REFERENCE TO RELATED APPLICATIONS

This application is related to U.S. patent application Ser. No. 11/645,366 titled QUEUE MANAGEMENT METHOD IN A NETWORK PROCESSOR which was filed on Dec. 22, 2006.

BACKGROUND

Quality of Service (QoS) for Internet traffic is important for applications such as video streaming, teleconferencing, and voice over Internet Protocol (VoIP) traffic. QoS control mechanisms may be implemented to provide different priorities to different data flows or to guarantee a certain level of performance to a data flow in accordance with requests from an application program. QoS guarantees are important especially if network capacity is limited such as for real-time streaming multimedia applications.

QoS for Internet traffic can be implemented using a queue manager interrupt service request arbiter with hardware support or by software. The software solution must simultaneously keep track of the number of packets serviced for each and every queue and compare and update them with the number of allowable packets to enable QoS. This method extracts substantial processing overhead from the core processor. Additionally, dynamic change of queue priorities and the scalability of the number of queues are not straight forward.

BRIEF DESCRIPTION OF THE DRAWINGS

FIG. 3 illustrates exemplary QoS for bulk network traffic in accordance with one or more embodiments.

FIG. 4 illustrates exemplary QoS for isochronous network traffic in accordance with one or more embodiments.

DETAILED DESCRIPTION

Various embodiments are directed to scalable and configurable queue management for network packet traffic QoS. In one or more embodiments, the queue management may be implemented by a network processor comprising a queue manager to assert interrupts indicating that one or more queues require service, and a core processor to apply an interrupt mask to a status register value read from the queue manager identifying the one or more queues that require service and to provide service during a particular service cycle to only those queues that are not masked out.

The described embodiments may be implemented as a software methodology. It can be appreciated that described embodiments may implement QoS in software using current and future processor and chipset architectures as well as in older chips that do not have extensive hardware support for QoS. Flexible QoS may be enabled with minimal software overhead using existing hardware and with minimal hardware acceleration or support. Accordingly, the described embodiments may provide benefits in communication chip design for implementing flexible QoS processing of network packet traffic within processor or networking systems.

In various implementations, the described embodiments manage and store queue priority information utilizing system memory. The state of each and every queue priority may be stored in memory to offload the task of managing queue priorities from the core processor. In some cases, managing priority information for queues can be reduced to keeping track of a pointer in memory. In addition, tracking can be done by a co-processor or micro-engine within the network processor, leaving the core processor dedicated solely to servicing network packets.

In various implementations, the described embodiments may allow a user to dynamically and easily change the priorities of queues by changing the interrupt mask set in memory. The ability to easily change the priority of each queue by programming a set of bit patterns to memory enables software to dynamically change the priority of Internet streams based on network traffic conditions, bandwidth, latency needs of real-time network application software, and so forth. In addition, programming different bit patterns of ones and zeroes into the interrupt masks and having different packet quotas for each queue allows network streams to implement either bulk or isochronous behavior to suit the needs of different types of application. Furthermore, the number of queues is easily scalable by adjusting the length of the interrupt masks.

Figure 1:
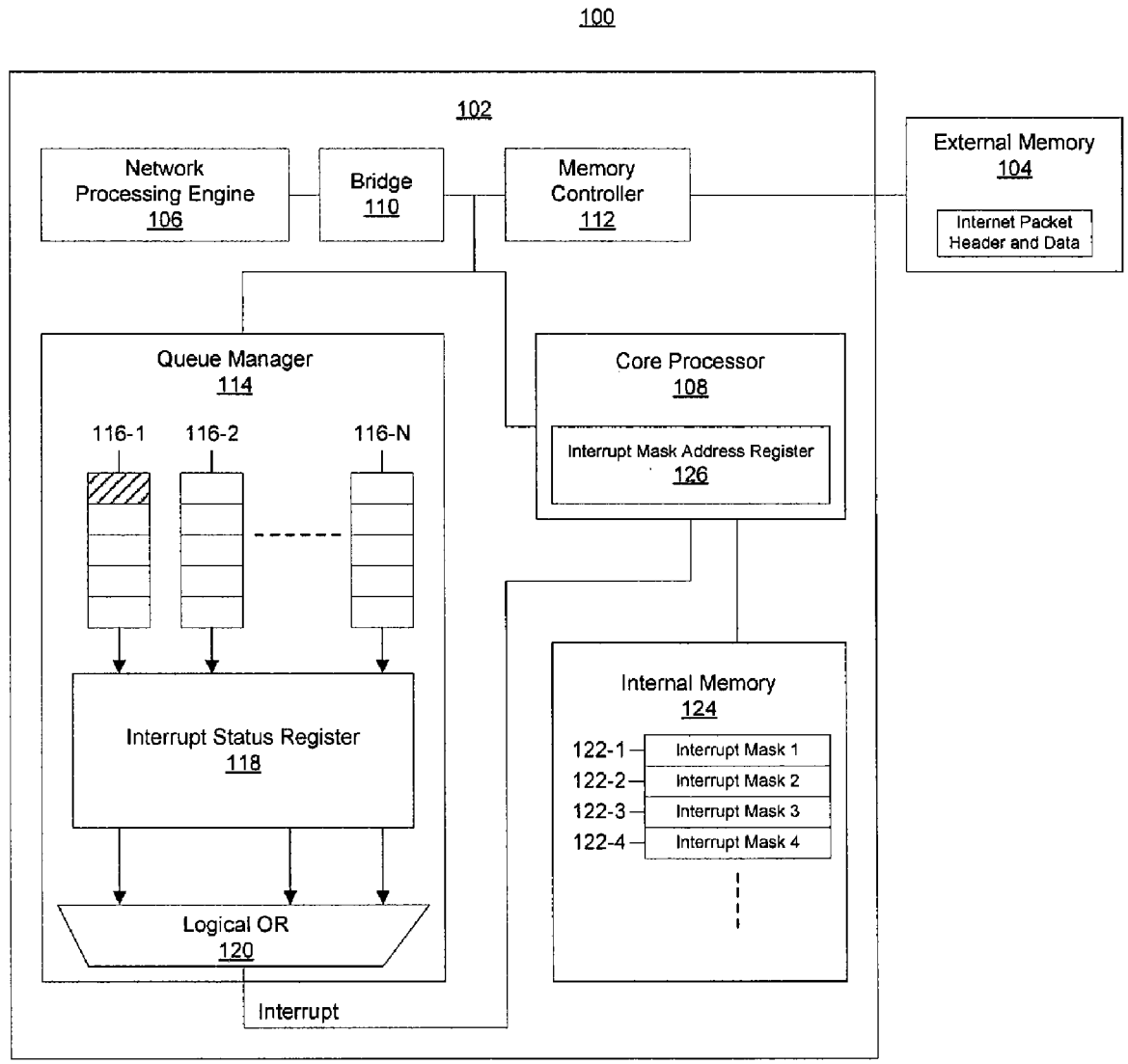
FIG. 1 illustrates a communications system in accordance with one or more embodiments.

FIG. 1 illustrates a communications system 100 in accordance with one or more embodiments. In general, the communications system 100 may comprise various physical and/or logical components for communicating information which may be implemented as hardware, software, or any combination thereof, as desired for a given set of design parameters or performance constraints. Although FIG. 1 may show a limited number of components by way of example, it can be appreciated that a greater or a fewer number of components may be employed for a given implementation.

The communications system 100 may be arranged to communicate one or more types of information, such as media information and control information. Media information generally may refer to any data representing content meant for a user, such as image information, video information, audio information, audio/video (A/V) information, graphical information, voice information, textual information, numerical information, alphanumeric symbols, character symbols, and so forth. Control information generally may refer to any data representing commands, instructions or control words meant for an automated system, such as information used to route media information through a system, or instruct a node to process media information in a certain manner. The media information and control information may be segmented into a series of packets, such as network packets (e.g., Internet packets). Each packet may comprise, for example, a discrete data set having a fixed or varying size represented in terms of bits or bytes. It can be appreciated that other types of content and formats which are consistent with the described embodiments may be used.

The communications system 100 may comprise a network processor 102. The network processor 102 may be implemented, for example, as a communications processor arranged to perform networking applications such as switching and routing functions for local area networks (LANs) and/or wide area networks (WANs). In one or more embodiments, the network processor 102 may be implemented by a network processor (e.g., Westport IXP23XX, Hamoa IXP43X) and/or core server chipset available from Intel Corporation of Santa Clara, Calif. It can be appreciated that other types of processing devices or systems which are consistent with the described embodiments may be used.

In various implementations, the network processor 102 may be arranged to process a flow of network packets received over a communications media from a digital network, such as the Internet. The communications media may comprise wired communication media, wireless communication media, or a combination of both, as desired for a given implementation. Examples of a wired communication media, may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. Examples of a wireless communication media may include, without limitation, a radio channel, satellite channel, television channel, broadcast channel infrared channel, radio-frequency (RF) channel, Wireless Fidelity (WiFi) channel, a portion of the RF spectrum, and/or one or more licensed or license-free frequency bands. Although certain embodiments may be described and illustrated using a particular communications media by way of example, it can be appreciated that the principles and techniques discussed herein may be applicable to various communication media and accompanying technology.

The network processor 102 may be arranged to receive network packets comprising content from a media source. The media source generally may comprise various devices and/or systems capable of delivering packets comprising static or dynamic media content such as a multimedia server arranged to provide broadcast or streaming media content to the network processor 102. The media source also may comprise or form part of an Internet Protocol (IP) system that delivers digital audio and/or video content over an IP connection, such as a broadband connection. The media source may comprise or form part of a media distribution system (DS) or broadcast system such as an over-the-air (OTA) broadcast system, digital video broadcast (DVB) system, radio broadcast system, satellite broadcast system, and so forth. The media source may be implemented within an interactive system that allows users to select and receive media content over a network. The embodiments are not limited in this context.

As shown, the network processor 102 may be coupled to a memory 104. In one or more embodiments, the memory 104 may be arranged to store headers and data for the packets received at the network processor 102. The memory 104 may be implemented, for example, by external Dynamic Random Access Memory (DRAM) such as synchronous DRAM (SDRAM) or Double-Data-Rate DRAM (DDRAM). It can be appreciated that other types of storage media which are consistent with the described embodiments may be used.

As illustrated, the network processor 102 may comprise several functional components or modules. Such components may be implemented by one or more chips or integrated circuits (ICs) and may comprise, for example, hardware and/or software such as logic (e.g., instructions, data, code, etc.) to be executed by a logic device (e.g., processor, core, controller, computer, etc.). Executable logic may be stored internally or externally to a logic device on one or more types of computer-readable storage media such as volatile or non-volatile memory, removable or non-removable memory, erasable or non-erasable memory, writeable or re-writeable memory, and so forth. Components may be physically or logically coupled and/or connected by communications media comprising wired communication media, wireless communication media, or a combination of both, as desired for a given implementation.

The network processor 102 may comprise a network processor engine (NPE) 106 for processing Internet packet traffic. The NPE 106 may be implemented as a dedicated-function, multi-threaded processor engine comprising an NPE core and including hardware-based co-processors. In various implementations, the NPE 106 may be arranged to off-load processing functions required by a core processor 108. In one or more embodiments, the core processor 108 may be implemented by a low-power core processor, such as an Intel XScale® processor. It can be appreciated that other types of processing devices or systems which are consistent with the described embodiments may be used.

In one or more embodiments, the NPE 106 may be arranged to receive and transmit packets (e.g., Internet packets) to the memory 104 (e.g., external DRAM) through a bridge 110 and a memory controller 112. The bridge 110 may comprise an interface to allow the NPE 106 to access and transfer data among various peripherals and internal targets within network processor 102. The memory controller 112 may be coupled to the memory 104 and perform data transfers between the memory 104 and various functional units within the network processor 102.

The network processor 102 may comprise a queue manager 114 for providing queuing functionality when processing network packet traffic. In various implementations, the queue manager 114 may comprise a set of queues 116-1-N, such as first-in-first-out (FIFO) circular buffers where N represents any positive integer value limited only by the constraints of the network processor 102. In one or more embodiments, the queue manager 114 may be implemented as an Advanced High-Performance Bus (AHB) Queue Manager. In other embodiments, the core processor 108 and the queue manager 114 can be implemented on separate silicon dies or chips. For example, the core Processor 108 can be any of Intel's general purpose processors (single or multiple cores), while the queue manager 114 can be integrated into its supporting Memory Controller Hub (MCH) and/or IO Controller Hub (ICH) chipsets). It can be appreciated that other types of queuing devices or systems which are consistent with the described embodiments may be used.

In various implementations, packets received by the NPE 106 or network supporting chipset may be stored in the memory 104 (e.g., external DRAM) while the addresses of the packets used by the memory 104 may be provided to the queue manager 114. In one or more embodiments, the network packet addresses from the memory 104 may be written to one or more of the queues 116-1-N within queue manager 114 based on relative priority. The relative priority of a packet may be extracted based on data stream, packet header, latency needs, and so forth.

The NPE 106 may store the packet in the external memory 104 and the address of the packet used by the external memory 104 within the queue manager 114. As shown, the queue manager 114 may comprise an interrupt status register 118 and a logical OR 120 for asserting an interrupt to the core processor 108. When one or more of the queues 116-1-N becomes filled, the queue manager 114 may assert an interrupt to the core processor 108. One or more of the queues 116-1-N may become filled, for example, upon reaching a programmable threshold. All of the queues 116-1-N can assert their interrupt at any time when they are full. Multiple interrupts are coalesced by the OR Logic 120 into a uniform interrupt to the core processor 108. The queue manager 114 may assert an interrupt requesting the core processor 108 to process the packets in memory 104 which are pointed to by the addresses stored inside of the queue associated with the asserted interrupt.

The asserted interrupt indicates to the core processor 108 that one or more queues 116-1-N requires service (e.g., filled). In response to the asserted interrupt, the core processor 108 may examine the interrupt status register 118 in the queue manager 114 to obtain an interrupt status register value for determining which of the queues 116-1-N caused the interrupt.

The network processor 102 may comprise a set of interrupt masks 122-1-4. For simplicity only four interrupt masks 122-1-4 are shown. It can be appreciated that any number of interrupt masks may be used limited only by the constraints of the network processor 102. In one or more embodiments, the interrupt masks 122-1-4 may be pre-written and stored in a memory 124. The memory 124 may be implemented, for example, by internal or external memory such as Static Random Access Memory (SRAM) (e.g., Quad Data Rate (QDR) SRAM), DRAM, processor cache, or any other type of storage media which is consistent with the described embodiments.

In various implementations, the set of interrupt masks 122-1-4 may be programmed with different bit patterns and cyclically used to mask out interrupts from one or more of the queues 116-1-N for certain service cycles. Accordingly, each of the queues 116-1-N will be given a fixed number of packets that can be serviced within a dedicated time frame. The size of the interrupt masks 122-1-4 may be any size. In one or more embodiments, the size of each of the interrupt masks 122-1-4 may correspond to the number of queues (e.g., 32 bits for 32 queues, 64 bits for 64 queues, etc.) Accordingly, scalability to a very large number of queues may be achieved by extending the size of the interrupt mask. In one or more embodiments, the number of queues supported by the QOS method can be dynamically changed by reducing or extending the size of all interrupt masks in the interrupt masks set when the number of queues changes.

To enable QoS processing of Internet packets, the core processor 108 may be arranged to periodically perform a logical AND between the interrupt status register value with the set of interrupt masks 122-1-4 pre-programmed by the user so that only those queues which do not have their interrupt masked out will be given service. For example, during a particular service cycle, one or more low priority queues may be masked out by an interrupt mask so that only one or more high priority queues will receive service. It can be appreciated that a logical OR can also be employed if logic ONE is used to disable interrupts instead of logic ZERO as described above.

In various implementations, the priority of multiple queues 116-1-N can be grouped together and managed by a single bit in the set of interrupt masks 122-1-4. For example to manage N (e.g., N=30) queues with three different priority levels, queues 116-1 to 116-X can be collectively assigned to have high priority bandwidth, queues 116-(X+1) to 116-Y can be collectively assigned to medium priority bandwidth, and queues 116-(Y+1) to 116-N (e.g., N=30) can be assigned to have low priority bandwidth, where 1<X<Y<N.

In one or more embodiments, the interrupt masks 122-1-4 may be pre-written into consecutive locations in the memory 124 starting from a base address (BASE_ADDR). The base address points to the first interrupt mask 122-1 and is stored in an interrupt mask address register (INT_MASK_ADDR_REG) 126 implemented by the core processor 108. In some embodiments, the interrupt mask address register 126 can be replaced by a locked down entry in the processor cache of the core processor 108.

The core processor 108 may be arranged to cycle through the set of interrupt masks 122-1-4 by maintaining and incrementing a pointer value in the interrupt mask address register 126. The core processor 108 may determine whether there is an asserted interrupt from the queues manager 114. If there is no interrupt from the queue manager 114, the core processor 108 may update the interrupt mask address register 126 with a new pointer value.

In one or more embodiments, the interrupt mask address register 126 is updated with a new pointer value comprising the prior value incremented by the size of one interrupt mask (e.g., Value of INT_MASK_ADDR_REG<=Value of INT_MASK_ADDR_REG+<size of one interrupt mask (rounded up to the nearest byte)>). The interrupt mask address register 126 may be arranged to loop back to the base address (BASE_ADD) when the last interrupt mask is reached.

If there is an interrupt from the queue manager 114, the core processor 108 may read the interrupt status register value from the interrupt status register 118 in the queue manager 114, read the interrupt mask pointed to by the pointer value in the interrupt mask address register 126, and perform a logical AND between the interrupt status register value and the interrupt mask. The interrupt mask status register value indicates which of the queues 116-1-N require service. The interrupt mask indicates which of the queues 116-1-N are allowed to receive service during a particular service cycle. By performing a logical AND between the interrupt status register value and the interrupt mask, the interrupts for the queues which are not allowed to receive service during the particular service cycle will be masked out.

During a particular service cycle, only certain queues (e.g., high priority queues) will receive service even if several or all queues require service. In one or more embodiments, a queue that is allowed to receive service will be serviced for a maximum number (NUM) of packets for a service cycle. The maximum number (NUM) of packets may be configurable by the user for each of the queues 116-1-N and/or for each service cycle.

After servicing all the queues 116-1-N with an unmasked asserted interrupt, the pointer value in the interrupt mask address register 126 is incremented to advance arbitration to the next round. The core processor 108 may update the interrupt mask address register 126 with a new pointer value and repeat the process. In one or more embodiments, the interrupt mask address register 126 is updated with a new pointer value comprising the prior value incremented by the size of one interrupt mask (e.g., Value of INT_MASK_ADDR_REG<=Value of INT_MASK_ADDR_REG+<size of one interrupt mask (rounded up to the nearest byte)>). The interrupt mask address register 126 may be arranged to loop back to the base address (BASE_ADD) when the last interrupt mask is reached.

It can be appreciated that if high priority network streams (e.g., network streams A and B) do not require service while a low priority network stream (e.g., network stream C) does require service, the pointer value is advanced to the next round of arbitration so that the low priority network stream is eventually serviced and avoids starvation. Updating the pointer value avoids the starvation of low priority queues.

Figure 2:
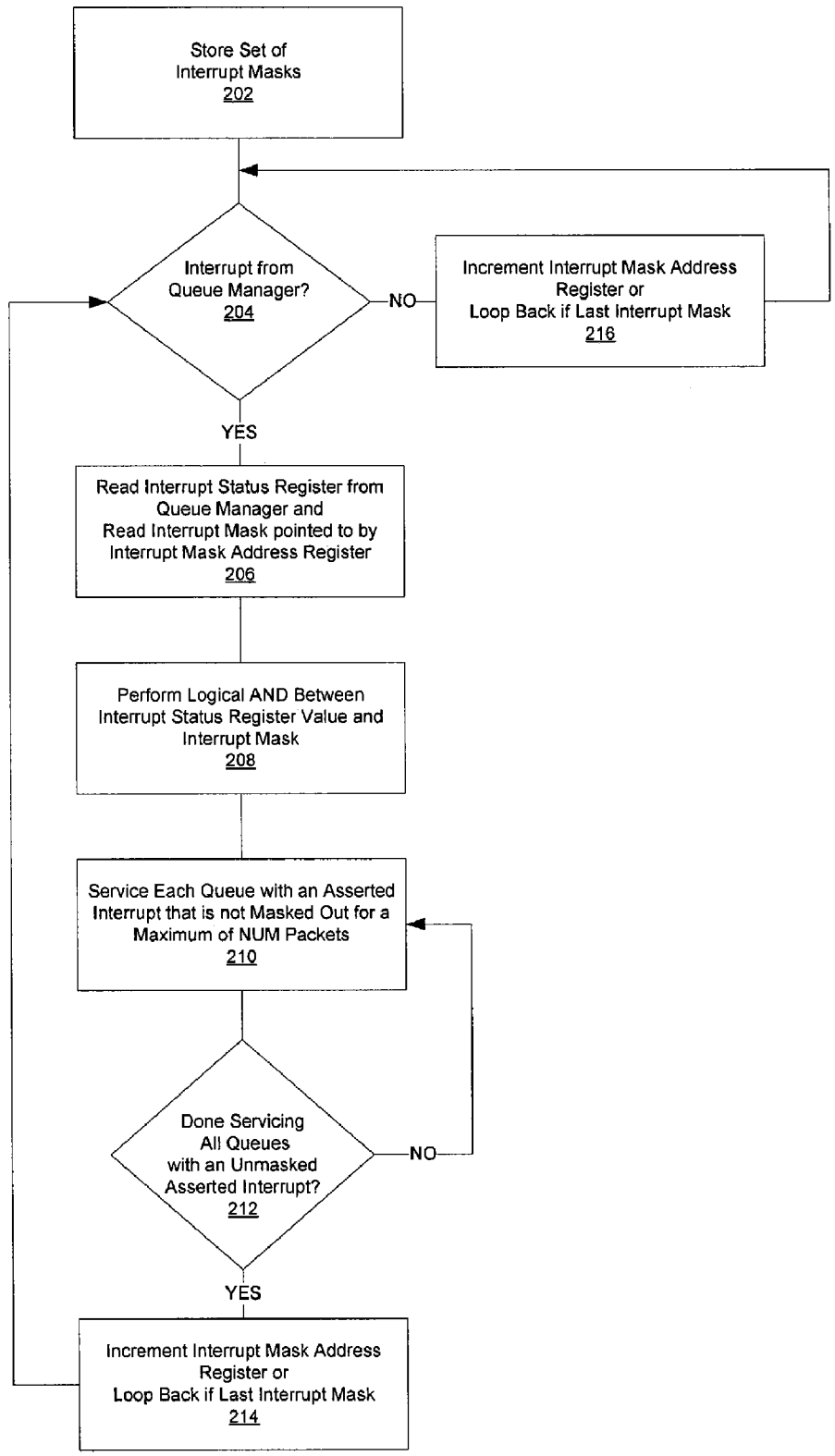
FIG. 2 illustrates a logic flow in accordance with one or more embodiments.

FIG. 2 illustrates a logic flow 200 in accordance with one or more embodiments. The logic flow 200 may be performed by various systems and/or devices and may be implemented as hardware, software, and/or any combination thereof, as desired for a given set of design parameters or performance constraints. For example, the logic flow 200 may be implemented by a logic device (e.g., core processor) and/or logic (e.g., queue management logic) comprising instructions, data, and/or code to be executed by a logic device. For purposes of illustration, and not limitation, the description of the logic flow 200 may reference FIG. 1.

The logic flow 200 may comprise storing a set of interrupt services masks 122-1-4 (block 202). In various embodiments, each of the interrupt masks 122-1-4 may comprise a dedicated bit pattern masking out certain interrupts and/or queues 116-1-N. The interrupt masks 122-1-4 may be pre-written into consecutive location in the internal memory 124 starting from a base address (BASE_ADDR). The base address may be stored in an interrupt mask address register 126 or a locked down entry of the processor cache of the core processor 108.

If there are pending interrupts from the queue manager 114 (block 204), the core processor 108 may read the interrupt status register 118 from the queue manager and read the interrupt mask from the memory location pointed to by the interrupt mask address register 126 (block 206). The core processor 108 may perform a logical AND between the interrupt status value and the interrupt mask to determine which of the queues 116-1-N will be given service (block 208). It can be appreciated that a logical OR can also be employed if logic ONE is used to disable interrupts instead of logic ZERO as described above.

The core processor 108 may provide services to each of the queues 116-1-N with an asserted interrupt that is not masked out for a predefined maximum number (NUM) of packets (block 210). If all the queues with an unmasked asserted interrupt have not been serviced (block 212), the core processor 108 continues service (block 210). When all the queues with an unmasked asserted interrupt have been serviced (block 212), the core processor 108 increments the pointer value of the interrupt mask address register 126 by the size of one interrupt mask (block 214).

For the next interrupt mask in line until the last interrupt mask is reached, the logic flow 200 is repeated from block 204. If the last interrupt mask has been reached, the value of the interrupt mask address register 126 will loop back to the base address, and the logic flow 200 is repeated from block 204.

If there are no pending interrupts from the queue manager 114 (block 204), the core processor 108 increments the value of the interrupt mask address register value 126 by the size of one interrupt mask (block 216). In various embodiments, the size of the increment will depend on the number of queues 116-1-N. For example, if 64 queues are present, then a 64-bit word may be used track of all the individual queue interrupts, and the increment size is 8 bytes.

In some embodiments, the block 216 may be omitted and/or optional in certain implementations. In such embodiments, if low priority queues inside the queue manager 114 are still able to interrupt the core processor 108 and advance the pointer when high priority queues do not have packets to service, then there will be no starvation. This is a viable implementation provided the low priority queue is able to wait for the interrupt mask pointer to reach the mask in which it will be given service. In such implementations, the block 216 can potentially be removed without a substantial impact to QOS performance.

FIG. 3 illustrates exemplary QoS for bulk network traffic in accordance with one or more embodiments. In this example, the network streams A-D correspond to queues, and the priority of the network streams A-D is shown horizontally. Network stream A is the highest priority stream and has twice the bandwidth of network stream B and four times the bandwidth of network stream C in time interval T. Network stream D is the lowest priority stream and disabled for all service cycles in time interval T.

In this embodiment, interrupt masks are shown vertically as 4-bit wide patterns comprising 1's (unmasked) and 0's (masked). It can be appreciated that the interrupt masks may comprise various sizes and that other suitable connotations or values may be used.

As shown in FIG. 3, during the first service cycle, network stream D is masked out. Accordingly, service will be provided only to network streams A, B, and C during the first service cycle if all network streams require service. During the second service cycle, only network streams A and B will receive service even if all network streams require service. During the third service cycle, only network stream A will receive service even if all network streams require service. If high priority network streams (e.g., network streams A and B) do not require service while a low priority network stream (e.g., network stream C) does require service, the pointer value is advanced to the next round of arbitration so that the low priority network stream is eventually serviced and avoids starvation.

FIG. 4 illustrates exemplary QoS for isochronous network traffic in accordance with one or more embodiments. Network stream A is the highest priority stream and has twice the bandwidth of network stream B and four times the bandwidth of network stream C in time interval T. Network stream D is the lowest priority stream and disabled for all service cycles in time interval T. In this example, by changing the bit patterns for network streams B and C, network streams B and C become isochronous streams with the same bandwidth as streams B and C shown in FIG. 3. However, it can be appreciated that any suitable and consistent bit patterns representing different priorities for queues can be employed.

In various implementations, the priority of multiple queues can be grouped together and managed by a single bit in the interrupt mask set. For example to manage N (e.g., N=30) queues with only three different priority levels similar to network streams A, B, and C in FIG. 4, queues 1 to X can be collectively assigned to have the bandwidth of network stream A, queues X+1 to Y can be collectively assigned to have the bandwidth of network stream B, and queues Y+1 to N (e.g., N=30) can be assigned to have the bandwidth of network stream C, where 1<X<Y<N.

Figure 5:
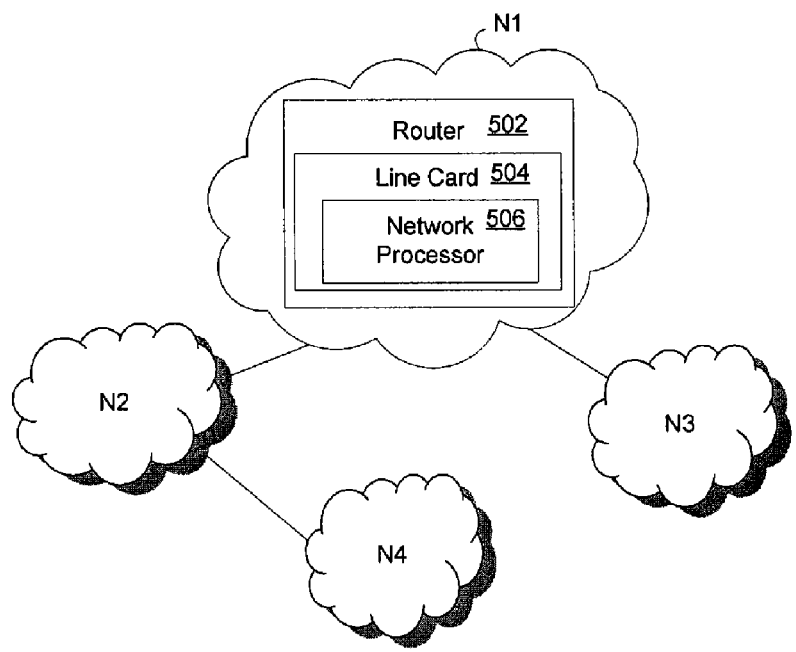
FIG. 5 illustrates a switching system in accordance with one or more embodiments.

FIG. 5 illustrates a switching system 500 in accordance with one or more embodiments. As shown, the switching system 500 may comprise a switching device 502 implemented as a router, for example. The switching device 502 may comprise a network processor 506 implemented as described above. In one or more embodiments, the network processor 506 may form a part of a line card 504 within the switching device 502.

The switching device 502 may be implemented by a first network N1 and may be coupled to one or more other networks N2, N3, N4. Examples of networks include: a Wide Area Network (WAN), Local Area Network (LAN), Metropolitan Area Network (MAN), wireless WAN (WWAN), wireless LAN (WLAN), wireless MAN (WMAN), wireless personal area network (WPAN), Worldwide Interoperability for Microwave Access (WiMAX) network, broadband wireless access (BWA) network, the Internet, the World Wide Web, telephone network, radio network, television network, cable network, satellite network such as a direct broadcast satellite (DBS) network, Code Division Multiple Access (CDMA) network, third generation (3G) network such as Wide-band CDMA (WCDMA), fourth generation (4G) network, Time Division Multiple Access (TDMA) network, Extended-TDMA (E-TDMA) cellular radiotelephone network, Global System for Mobile Communications (GSM) network, GSM with General Packet Radio Service (GPRS) systems (GSM/GPRS) network, Synchronous Division Multiple Access (SDMA) network, Time Division Synchronous CDMA (TD-SCDMA) network, Orthogonal Frequency Division Multiplexing (OFDM) network, Orthogonal Frequency Division Multiple Access (OFDMA) network, North American Digital Cellular (NADC) cellular radiotelephone network, Narrowband Advanced Mobile Phone Service (NAMPS) network, Universal Mobile Telephone System (UMTS) network, and/or any other wired or wireless communications network configured to carry data in accordance with the described embodiments.

The switching system 500 may communicate information in accordance with one or more protocols. A protocol may comprise a set of predefined rules or instructions for managing communication among nodes. In various embodiments, for example, the switching system 500 may employ one or more protocols such as medium access control (MAC) protocol, Physical Layer Convergence Protocol (PLCP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), and so forth.

The switching system 500 may communicate information in accordance with one or more standards as promulgated by a standards organization, such as the International Telecommunications Union (ITU), the International Organization for Standardization (ISO), the International Electrotechnical Commission (IEC), the Institute of Electrical and Electronics Engineers (IEEE), the Internet Engineering Task Force (IETF), and so forth.

Figure 6:
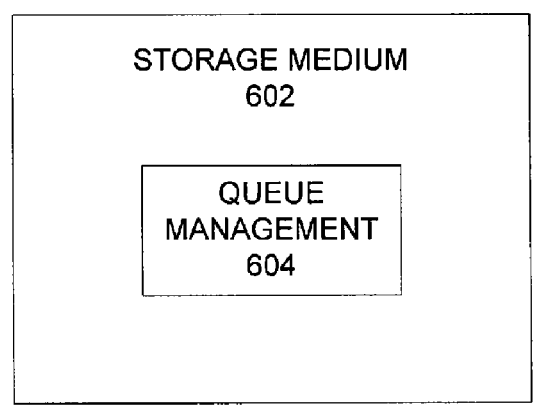
FIG. 6 illustrates an article of manufacture in accordance with one or more embodiments.

FIG. 6 illustrates an article of manufacture 600 in accordance with one or more embodiments. As shown, the article 600 may comprise a storage medium 602 to store queue management logic 604 for performing various operations in accordance with the described embodiments. In various embodiments, the article 600 may be implemented by various systems, components, and/or modules.

The article 600 and/or computer-readable storage medium 602 may include one or more types of storage media capable of storing data, including volatile memory or, non-volatile memory, removable or non-removable memory, erasable or non-erasable memory, writeable or re-writeable memory, and so forth. The article 600 and/or computer-readable medium 602 may store queue management logic 604 comprising instructions, data, and/or code that, if executed by a computing system, may cause the computing system to perform a method and/or operations in accordance with the described embodiments. Such a computing system may include, for example, any suitable computing platform, computing device, computer, processing platform, processing system, processor, or the like implemented using any suitable combination of hardware and/or software.

The queue management logic 604 may comprise, or be implemented as, software, a software module, an application, a program, a subroutine, instructions, an instruction set, computing code, words, values, symbols or combination thereof. The instructions may include any suitable type of code, such as source code, compiled code, interpreted code, executable code, static code, dynamic code, and the like. The instructions may be implemented according to a predefined computer language, manner or syntax, for instructing a computing system and/or processor to perform a certain function. The instructions may be implemented using any suitable programming language.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is worthy to note that any reference to "one embodiment" or "an embodiment" means that a particular feature, structure, or characteristic described in connection with the embodiment is included in at least one embodiment. The appearances of the phrase "in one embodiment" in the specification are not necessarily all referring to the same embodiment.

Various embodiments may comprise one or more elements. An element may comprise any structure arranged to perform certain operations. Each element may be implemented as hardware, software, or any combination thereof, as desired for a given set of design and/or performance constraints. Although an embodiment may be described with a limited number of elements in a certain topology by way of example, the embodiment may include more or less elements in alternate topologies as desired for a given implementation.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, API, exchanging messages, and so forth.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a processor, or any combination thereof.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

The invention claimed is:

1. A network processor comprising:
   a queue manager to assert interrupts indicating that one or more queues require service;
   a core processor to apply an interrupt mask to a status register value read from the queue manager identifying the one or more queues that require service and to provide service during a particular service cycle to only those queues that are not masked out; and
   a set of interrupt masks, each interrupt mask comprising a dedicated bit pattern to mask out certain interrupts or queues.

2. The network processor of claim 1, the set of interrupt masks pre-written into consecutive locations in a memory starting from a base address, the core processor storing a pointer value that starts with the base address and increments to cycle through the set of interrupt masks.

3. The network processor of claim 1, wherein width of the interrupt masks corresponds to number of queues within the queue manager.

4. The network processor of claim 3, wherein width of the interrupt masks is configurable for scaling to a greater or a fewer number of queues.

5. The network processor of claim 1, wherein bit patterns of interrupt masks are programmable to implement queue priority.

6. The network processor of claim 1, wherein bit patterns of interrupt masks are programmable to implement bulk or isochronous behavior.

7. A system comprising
a network processor comprising:
   a queue manager to assert interrupts indicating that one or more queues require service,
   a core processor to apply an interrupt mask to a status register value read from the queue manager identifying the one or more queues that require service and to provide service during a particular service cycle to only those queues that are not masked out, and
   a set of interrupt masks, each interrupt mask comprising a dedicated bit pattern to mask out certain interrupts or queues; and
a synchronous dynamic random access memory (SDRAM) coupled to the network processor.

8. A method comprising:
storing a set of interrupt masks, wherein each interrupt mask comprises a dedicated bit pattern to mask out certain interrupts or queues;
receiving one or more interrupts from a queue manager indicating that one or more queues require service;
reading a status register value from the queue manager identifying the one or more queues that require service;
reading an interrupt mask pointed to by a pointer value in an interrupt mask address register;
applying the interrupt mask to the status register value; and
providing service during a particular service cycle to only those queues that are not masked out.

9. The method of claim 8 wherein applying the interrupt mask comprises performing either a logical AND or a logical OR between the interrupt status value and the interrupt mask.

10. The method of claim 8 further comprising providing service for a predefined maximum number of packets.

11. The method of claim 8 further comprising incrementing the pointer value by a size of one interrupt mask when all queues that are not masked out have been serviced.

12. The method of claim 11 further comprising looping back to an initial pointer value when reaching a last interrupt mask.

13. The method of claim 8 further comprising incrementing the pointer value of the interrupt mask address register by the size of one interrupt mask if there are no pending interrupts from the queue manager.

14. The method of claim 13, wherein incrementing the pointer value when there are no pending interrupts is optional unless low priority queues are able to assert interrupts to advance the pointer value of the interrupt mask register to a next round when there are no interrupts from high priority queues.

* * * * *